(12) United States Patent
Ulrich et al.

(10) Patent No.: US 8,857,031 B2
(45) Date of Patent: Oct. 14, 2014

(54) METHOD FOR PRODUCING AN OBJECTIVE

(75) Inventors: Matthias Ulrich, Rosdorf (DE); Arnold Sonntag, Göttingen (DE); Thomas Thöniss, Göttingen (DE)

(73) Assignee: Qioptiq Photonics GmbH & Co KG, Goettingen (DE)

(\*) Notice: Subject to any disclaimer, the term of this patent is extended or adjusted under 35 U.S.C. 154(b) by 198 days.

(21) Appl. No.: 13/030,414

(22) Filed: Feb. 18, 2011

(65) Prior Publication Data

US 2011/0185560 A1  Aug. 4, 2011

Related U.S. Application Data

(63) Continuation of application No. PCT/EP2009/005692, filed on Aug. 6, 2009.

(30) Foreign Application Priority Data

Aug. 18, 2008 (DE) .......................... 10 2008 038 245
Aug. 6, 2009 (EP) ..................................... 09777694

(51) Int. Cl.
| | |
|---|---|
| *B23P 19/00* | (2006.01) |
| *G02B 7/02* | (2006.01) |
| *G02B 7/00* | (2006.01) |

(52) U.S. Cl.
CPC ................ *G02B 7/003* (2013.01); *G02B 7/025* (2013.01)
USPC ................ 29/445; 29/557; 29/559; 359/811; 359/819

(58) Field of Classification Search
CPC ......... B23P 11/00; F16B 4/004; G02B 7/021; G02B 7/02; G02B 7/022; G02B 7/025; G02B 21/248; G02B 25/001; G02B 23/12
USPC ............ 29/445, 525, 557, 559; 359/642, 643, 359/819, 809, 811, 821, 822
See application file for complete search history.

(56) References Cited

U.S. PATENT DOCUMENTS

| | | | | |
|---|---|---|---|---|
| 2,251,177 A | * | 7/1941 | Thomas ........................ | 359/639 |
| 2,593,724 A | * | 4/1952 | Bouwers ....................... | 359/364 |
| 3,217,819 A | * | 11/1965 | Allen ............................ | 177/177 |

(Continued)

FOREIGN PATENT DOCUMENTS

| | | |
|---|---|---|
| DE | 2059814 | 7/1971 |
| DE | 204 320 A1 | 11/1983 |

(Continued)

OTHER PUBLICATIONS

Irving BR: "Code V Test Drive" May 1, 1989, Code V Test Drive, Optical Research Associates, (pp. 1-29).

(Continued)

*Primary Examiner* — Jermie Cozart
*Assistant Examiner* — Bayan Salone
(74) *Attorney, Agent, or Firm* — Peter A. Nieves; Sheehan Phinney Bass + Green PA

(57) ABSTRACT

Method for producing an objective, in which the outer mounting includes an outer surface that is, at least in sections, limited by a plane which extends inclined toward the optical axis or which extends at a distance from the optical axis.

8 Claims, 1 Drawing Sheet

(56) References Cited

U.S. PATENT DOCUMENTS

| | | | | |
|---|---|---|---|---|
| 4,304,487 A * | 12/1981 | Odone et al. | | 356/3.05 |
| 4,367,921 A * | 1/1983 | Sawamua et al. | | 359/586 |
| 4,655,555 A * | 4/1987 | Machler et al. | | 359/365 |
| 5,179,471 A * | 1/1993 | Caskey et al. | | 359/603 |
| 5,339,193 A * | 8/1994 | Korpert et al. | | 359/819 |
| 5,379,155 A * | 1/1995 | Goetschmann et al. | | 359/820 |
| 5,638,169 A * | 6/1997 | Hollmann et al. | | 356/127 |
| 6,445,516 B2 * | 9/2002 | Osterried | | 359/819 |
| 6,466,376 B1 * | 10/2002 | Koshimizu et al. | | 359/642 |
| 6,724,548 B2 * | 4/2004 | Weber | | 359/819 |
| 6,804,064 B2 * | 10/2004 | Hirakawa | | 359/682 |
| 6,829,107 B2 * | 12/2004 | Osterried | | 359/811 |
| 6,924,939 B2 * | 8/2005 | Itoh | | 359/689 |
| 7,068,441 B2 * | 6/2006 | Kim | | 359/686 |
| 7,079,326 B2 * | 7/2006 | Hirakawa | | 359/682 |
| 7,085,070 B2 * | 8/2006 | Mihara | | 359/686 |
| 7,092,170 B2 * | 8/2006 | Satori | | 359/689 |
| 7,106,522 B2 * | 9/2006 | Park | | 359/689 |
| 7,180,679 B2 * | 2/2007 | Nose et al. | | 359/682 |
| 7,292,380 B2 * | 11/2007 | Kim | | 359/2 |
| 7,312,931 B2 * | 12/2007 | Sano et al. | | 359/683 |
| 7,315,422 B2 * | 1/2008 | Masui et al. | | 359/680 |
| 7,558,001 B2 * | 7/2009 | Kim et al. | | 359/676 |
| 7,652,823 B2 | 1/2010 | Jiadi et al. | | |
| 7,830,616 B2 * | 11/2010 | Masugi | | 359/689 |
| 7,830,621 B2 * | 11/2010 | Jeong et al. | | 359/781 |
| 8,605,371 B2 | 12/2013 | Hackemer | | |
| 2001/0013978 A1 * | 8/2001 | Mihara | | 359/680 |
| 2002/0001142 A1 * | 1/2002 | Osterried | | 359/819 |
| 2002/0021503 A1 * | 2/2002 | Osterried | | 359/819 |
| 2003/0169517 A1 * | 9/2003 | Weber | | 359/819 |
| 2003/0193722 A1 * | 10/2003 | Mihara | | 359/684 |
| 2004/0257671 A1 | 12/2004 | Kim et al. | | |
| 2005/0105192 A1 * | 5/2005 | Park | | 359/689 |
| 2006/0012886 A1 * | 1/2006 | Kim | | 359/676 |
| 2007/0070513 A1 * | 3/2007 | Yamashita et al. | | 359/676 |
| 2007/0109663 A1 * | 5/2007 | Sano et al. | | 359/686 |
| 2007/0139787 A1 * | 6/2007 | Kim | | 359/680 |
| 2008/0062531 A1 * | 3/2008 | Kim et al. | | 359/676 |
| 2008/0204893 A1 * | 8/2008 | Jeong et al. | | 359/684 |
| 2009/0244509 A1 * | 10/2009 | Limbach et al. | | 355/67 |
| 2010/0265363 A1 | 10/2010 | Kim | | |
| 2011/0299176 A1 * | 12/2011 | Hackemer | | 359/684 |
| 2012/0212830 A1 | 8/2012 | Mewes et al. | | |

FOREIGN PATENT DOCUMENTS

| | | |
|---|---|---|
| DE | 34 06 907 A1 | 10/1984 |
| DE | WO 92/15031 | 9/1992 |
| DE | 103 22 587 A1 | 1/2005 |
| DE | 102007058158 A1 | 6/2008 |
| EP | 1 901 104 A1 | 3/2008 |
| JP | 60113203 A | 6/1985 |
| JP | 61011701 A | 1/1986 |
| JP | 2002010118 A | 1/2002 |
| JP | 2006 301262 A | 11/2006 |
| JP | 2006301262 | 11/2006 |
| WO | WO 2009/064076 A1 | 5/2009 |

OTHER PUBLICATIONS

International Search Report (ISR) in application No. PCT/EP2009/008800, filed Dec. 9, 2009, ISR dated Feb. 24, 2010 (7 pgs.).

Written Opinion in application No. PCT/EP2009/008800, filed Dec. 9, 2009, Opinion dated Feb. 24, 2010 (10 pgs.).

U.S. Appl. No. 13/030,414, filed Feb. 2011, Ulrich et al.

PCT International Search Report of PCT/EP2009/005692, dated Nov. 11, 2009 (2 pgs.).

Nikon Spiegelreflexkamera [single lens reflex (SLR) camera] F6 Photokina 2004 Brochure, dated 2004 (16 pgs.).

German Wikipedia article "Strahlteiler" ["Beam Splitter"] dated Oct. 4, 2010, 1 page.

German Wikipedia article "Brechungsindex" ["Refraction Index"] dated Feb. 16, 2011, 9 pages.

DE Office Action for German application No. 10 2011 012 155.2, filed Feb. 23, 2011, dated Oct. 17, 2011, 5 pages.

U.S. Appl. No. 13/158,159, filed Jun. 2011, Hackemer.

* cited by examiner

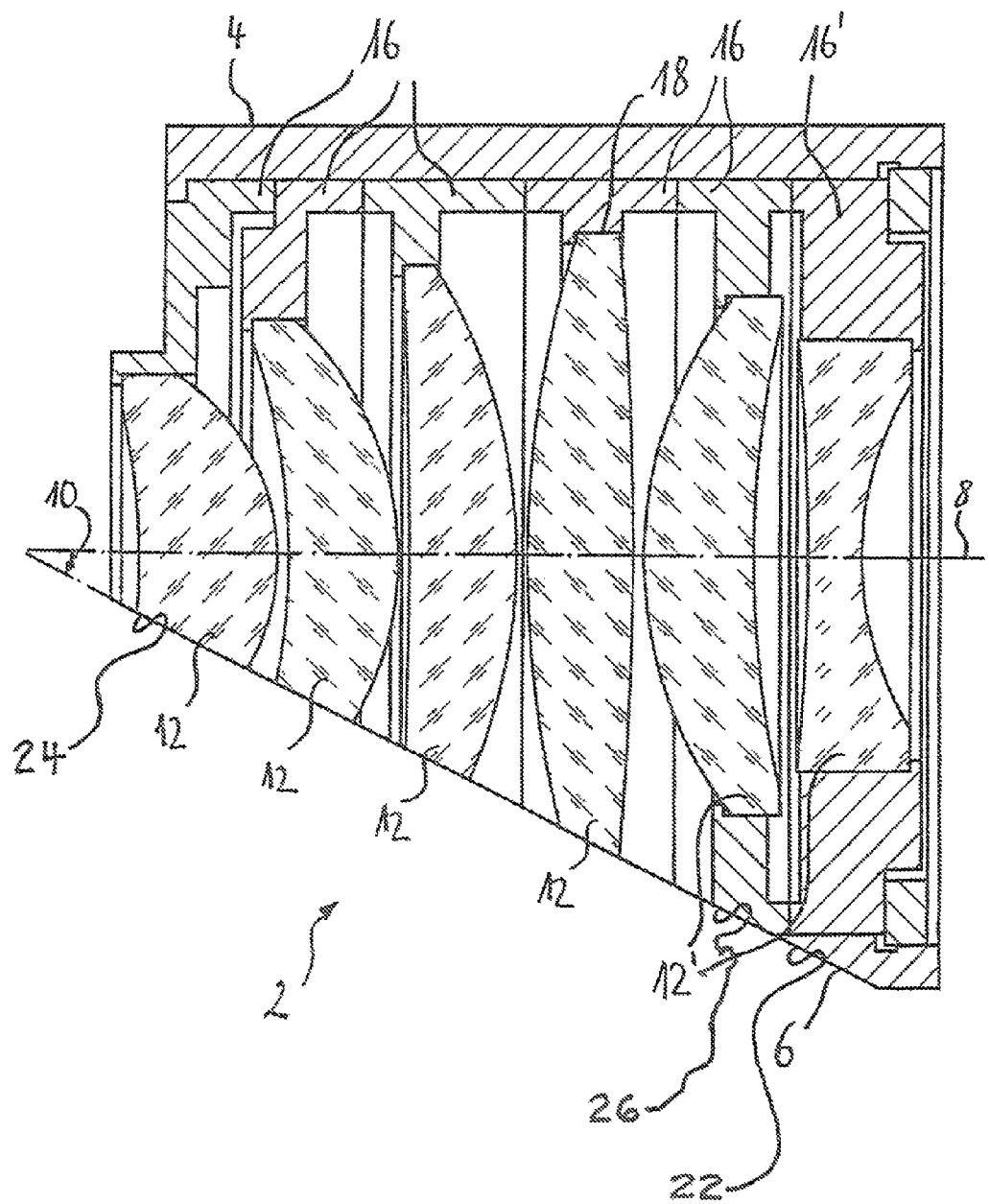

METHOD FOR PRODUCING AN OBJECTIVE

CROSS-REFERENCE TO RELATED APPLICATIONS

This application is a continuation of application no. PCT/EP2009/005692, filed Aug. 6, 2009, which claims the priority of German application no. 10 2008 038 245.0-51, filed Aug. 18, 2008, and each of which is incorporated herein by reference.

FIELD OF THE INVENTION

The invention relates to a method for the production of an objective, the outer mounting of which has an outer surface that is limited, at least in sections, by a plane which extends inclined toward the optical axis or which extends at a distance from the optical axis.

BACKGROUND OF THE INVENTION

Objectives have become widely used in various applications in private, commercial, as well as in industrial fields, and also in research and development. There are different types of objectives for the various applications that differ essentially in their geometry, as well as in the arrangement of the individual optical elements with their specific characteristics.

Objectives essentially consist of an arrangement of optical elements, which can be lenses, apertures and mirrors that are located at a distance with respect to each other along an optical axis. The individual optical elements are mounted in the outer mounting of an objective. The mounting of the individual optical elements can take place directly in the outer mounting; however, in particular in the case of higher demands, sub-mountings or inner mountings are used by means of which the optical elements are arranged in the objective.

In particular for industrial, as well as also for scientific optical applications, higher demands are made on the optical imaging quality of an objective. Frequently, for the examination of fine structures, such as integrated circuits, objectives are used as they are particularly well suited because of their imaging properties.

In these applications it is often required to image or illuminate individual areas on expanded objects, such as wafer surfaces, not orthogonally, but at a certain angle. Thereby, oftentimes as small an angle as possible is required between the optical axis of the objective and the wafer surface. However, the type of construction of known objectives, in particular their exterior dimensions and their working distance limits the incline of the objective, so that the desired small angles cannot be obtained with conventional objectives.

OBJECTS AND SUMMARY OF THE INVENTION

The object of the invention is to provide a method for producing an objective, an outer mounting of which has an outer surface that is limited, at least in sections, by a plane which extends at one of inclined toward the optical axis and at a distance from the optical axis, which overcomes the disadvantage of objectives produced according to known methods; i.e. achieves objectives that make possible, in contrast to known objectives, a smaller angle of inclination between optical axis and the object to be imaged.

This object is achieved by the invention which includes a method for producing an objective, an outer mounting of which has an outer surface that is limited, at least in sections, by a plane which extends at one of inclined toward the optical axis and at a distance from the optical axis, and in which:

a) the outer circumference of at least one lens for the formation of a surface lying in a plane is machined;
b) an inner mounting for the lens for the formation of a surface lying in a plane is machined;
c) the at least one lens is inserted in the inner mounting, and the outer surface of the inner mounting with at least one inserted lens is machine finished for fitting the at least one lens to an outer mounting of the objective; and
d) the machine finished inner mounting is inserted into the outer mounting.

In other words, in the method for producing an objective according to the invention the steps comprise:

a) finishing an outer circumference of at least one lens for the formation of a surface which is inclined and is limited by and is lying in the inclined plane;
b) finishing an inner mounting for the lens for the formation of an outer surface lying in the inclined plane;
c) inserting the at least one lens in the inner mounting, and finishing the outer surface of the inner mounting with at least one inserted lens for fitting the at least one lens to the outer mounting of the objective;
d) inserting the finished inner mounting into the outer mounting;
e) each one of the outer surface of the outer mounting, limited at least in sections, the surface of the outer circumference of the at least one lens, and the outer surface of the inner mounting is lying in the inclined plane.

The invention is based on the idea of providing a method, in order to produce an objective, the shape of which is finished in such a way that even small angles of inclination between the optical axis and the object to be imaged are made possible.

If, for example, and in particular in accordance with the invention, micro inspections of objects are to be performed at a small angle of inclination, then by means of the method in accordance with the invention, the shape of the objective with its optical elements can be adapted corresponding to the angle of inclination during the production of the objective.

For producing an objective, the outer mounting of which has an outer surface, which outer surface is, at least in sections, limited by a plane that extends inclined to the optical axis or at a distance from the optical axis, the exterior circumference of at least one lens, as well as an inner mounting for the lens, are machined for the formation of a surface that lies in the plane. Thereupon, the lens is inserted into the inner mounting, for example, glued in, and subsequently, the outer surface of the inner mounting (with inserted lens) is machine finished for adapting the lens to an outer mounting of the objective. Subsequently, the machine finished inner mounting with the inserted lens is inserted into the outer mounting. In this manner, an objective is produced by the method according to the invention that is configured in such a way that it makes micro inspections possible, even at small angles of inclination.

A particular advantage of the invention is that an objective can be produced easily and cost-effectively in such a way that a high optical imaging precision of the objective is made possible, even during micro inspections, in which the optical axis is inclined at a small angle of inclination with respect to the surface of the object to be imaged. By means of the invention it is likewise possible to adapt any objectives in such a way that with them, imaging or illumination tasks can be performed under the same conditions cited above. Consequently, a broad application spectrum results for the method according to the invention. Thus, the method according to the invention can also be used to adapt microscope objectives.

An advantageous further development of the invention provides that the lens as well as the inner mounting, and also the combination of the inner mounting and the lens inserted in it, can be finished by machining methods. Thereby, the machining can be done with tools with a geometrically defined cutting edge, as well as with tools with a geometrically undefined cutting edge. These include in particular, milling, turning, grinding, and sawing, as well as beveling and polishing. Accordingly, it is likewise possible, to accomplish the producing of the objective with the help of laser beam methods such as, for example, laser beam cutting. The selection of the machining tools essentially depends on the imaging quality that is to be realized, as well as also on the demands and/or the sequence of the individual production steps. Thus, for example, semi-finished optical products can be pre-fabricated by sawing, which are finished according to the specific demands made of the objective, by means of a different machining method such as, for example, milling.

As per the method according to the invention, for producing the objective, various machining methods can be used in order to finish the outer mounting, the inner mounting, as well as the lenses. However, it is also possible based on the invention, to finish the components of the objective essentially with the same machining methods, e.g. beveling. This results in the advantage that the same device can be used in order to finish the respective components of the objective and if necessary, according to the respective finishing process, only a change of the machining tool is required, as a result of which the effort required for the adjustment of the workpiece is eliminated.

An advantageous further development of the invention provides that the lens is retained in a positive fit in the inner mounting. For example, the positive fit connection can be accomplished by use of a suitable adhesive, so that a firm connection between lens and inner mounting can be achieved. This is then especially advantageous, when the objective must be changed frequently, for example, during inspections, and the thereby resulting danger that the lenses loosen from their inner mounting.

However, in accordance with the invention, other substance-to-substance connections can be used as well. In accordance with the invention, for retaining the lens in the inner mounting, as well as for retaining the inner mounting in the outer mounting, various connection methods can be used, so that depending on the demands made on the objective, and/or its components, positive fit, as well as force fit connections, and also a combination of force, form, and material fit connections are used.

In the following, the invention is described in more detail in connection with the attached drawing, in which one example of an embodiment of the objective is illustrated, which is produced according to the method in accordance with the invention. Thereby, all claimed, described, illustrated in the drawing and/or derivable characteristics by themselves, as well as in any combination with each other comprise the subject matter of the invention, independent of their summaries in the claims and their dependencies, as well as independent of their description or illustration in the drawing.

BRIEF DESCRIPTION OF THE DRAWINGS

The single FIGURE of the drawing shows an objective, that can be produced according to an embodiment of the method according to the invention. The illustration of the objective in the FIGURE is limited to the fundamental components and therefore dispenses with an illustration that is exact in detail and scale.

DETAILED DESCRIPTION OF THE INVENTION

The objective 2 includes an outer mounting 4, the outer surface of which is limited in sections by a plane 6 which is inclined toward the optical axis 8 at an angle 10.

The objective 2 includes an outer mounting 4, the outer surface 22 of which is limited in sections by a plane 6 which is inclined toward the optical axis 8 at an angle 10.

In addition, the objective 2 includes lenses 12 of different types, which are machined at least in part, first for the formation of a surface 24 that lies in the plane 6. In addition to the finished lenses 12, the objective also has lenses 12' that remain unfinished in this respect.

Further, it can be seen in the drawing that the illustrated objective 2 has inner mountings 16 for lenses 12 that have been machined for the formation of a surface 26 that lies in the plane 6. In addition to the finished inner mountings 16, the illustrated objective 2 also has an inner mounting 16' that remains unfinished in this respect.

According to the embodiment of a method in accordance with the invention, the lenses 12, which had been finished for the formation of the surface 24 lying in plane 6, were inserted into the inner mountings 16, which were also finished for the formation of the surface 26 lying in the plane 6, by use of an adhesive 18. In the interest of a better view, the adhesive 18 is only identified once with reference number 18 in the single FIGURE of the drawing. For the formation of plane 6, the inner mountings 16 with the inserted lenses 12 were machine finished by means of machine finishing using a milling method for fitting the lenses 12 to the outer mounting 4 of objective 2. Subsequently, the finished inner mountings 16 with the glued in lenses 12, were inserted into the outer mounting 4 of objective 2. It will be appreciated, as shown and described, that each one of outer surface 22 of the outer mounting 4, limited at least in sections, the surface 24 of the outer circumference of the at least one lens 12, and the outer surface 26 of the inner mounting 16 is lying in the inclined plane 6. That is, outer surface 22, surface 24, and outer surface 26 each lie in inclined plane 6.

With the help of the objective 2 shown in the drawing, which was produced by an embodiment of the method in accordance with the invention, it becomes clear that the method in accordance with the invention can be used for finishing various types of lenses, as well as inner mountings of various types. In addition to the finishing of the lenses 12 and inner mountings 16 as described, the method in accordance with the invention can likewise be used for other components of an objective, which can, for example, be mirror elements or aperture elements.

It can be seen that not all elements of an objective must be finished as per the method according to the invention for the formation of a plane that limits the outer surface of the outer mounting of an objective in every case. Additionally, it can be seen that various types of optical elements of an objective can be finished by way of the method according to the invention.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. Method for producing an objective having an optical axis, an outer mounting of which has an outer surface that is limited, at least in sections, by a plane which extends inclined toward the optical axis, and in the method the steps comprising:
   a) finishing an outer circumference of at least one lens for the formation of a surface which is inclined and is limited by and is lying in the inclined plane;
   b) finishing an inner mounting for the lens for the formation of an outer surface lying in the inclined plane;
   c) inserting the at least one lens in the inner mounting, and finishing the outer surface of the inner mounting with at least one inserted lens for fitting the at least one lens to the outer mounting of the objective
   d) inserting the finished inner mounting into the outer mounting; and
   e) each one of the outer surface of the outer mounting, limited at least in sections, the surface of the outer circumference of the at least one lens, and the outer surface of the inner mounting lying in the inclined plane.

2. Method according to claim 1, wherein: a) the inner mounting and the at least one lens are finished using a machining method.

3. Method according to claim 2, wherein:
   a) the at least one lens is retained in the inner mounting with a positive fit.

4. Method according to claim 3, wherein:
   a) the at least one lens is retained in the inner mounting with an adhesive.

5. Method according to claim 1, wherein:
   a) the at least one lens is retained in the inner mounting with an adhesive.

6. Method according to claim 1, wherein:
   a) the inner mounting includes inner mountings, and the at least one lens is finished using a machining method.

7. Method according to claim 6, wherein:
   a) the at least one lens is retained in the inner mountings with a positive fit.

8. Method according to claim 7, wherein:
   a) the at least one lens is retained in the inner mountings with an adhesive.

\* \* \* \* \*